(12) United States Patent
Strömberg et al.

(10) Patent No.: US 7,066,393 B2
(45) Date of Patent: Jun. 27, 2006

(54) SMART LABEL AND A SMART LABEL WEB

(75) Inventors: Samuli Strömberg, Tampere (FI); Marko Hanhikorpi, Pirkkala (FI)

(73) Assignee: Rafsec Oy, Tampere (FI)

( * ) Notice: Subject to any disclaimer, the term of this patent is extended or adjusted under 35 U.S.C. 154(b) by 0 days.

(21) Appl. No.: 10/715,012

(22) Filed: Nov. 17, 2003

(65) Prior Publication Data

US 2004/0169586 A1    Sep. 2, 2004

Related U.S. Application Data

(63) Continuation of application No. PCT/FI02/00444, filed on May 23, 2002.

(30) Foreign Application Priority Data

May 31, 2001    (FI)    ................................. 20011140

(51) Int. Cl.
*G06K 19/06*    (2006.01)
(52) U.S. Cl. ...................... 235/492; 235/487
(58) Field of Classification Search ................ 235/487, 235/492; 361/737, 761
See application file for complete search history.

(56) References Cited

U.S. PATENT DOCUMENTS

| | | |
|---|---|---|
| 3,628,977 A | 12/1971 | Deegan |
| 3,897,964 A | 8/1975 | Oka et al. |
| 4,021,705 A | 5/1977 | Lichtblau |
| 4,253,899 A | 3/1981 | Takemoto et al. |
| 4,288,499 A | 9/1981 | Kielbania, Jr. |
| 4,303,949 A | 12/1981 | Peronnet |
| 4,419,413 A | 12/1983 | Ebihara |
| 4,450,024 A | 5/1984 | Haghiri-Tehrani et al. |
| 4,455,359 A | 6/1984 | Patzold et al. |
| 4,686,152 A | 8/1987 | Matsubayashi et al. |
| 4,841,712 A | 6/1989 | Roou |
| 4,846,922 A | 7/1989 | Benge et al. |
| 4,866,505 A | 9/1989 | Roberts et al. |
| 4,954,814 A | 9/1990 | Benge |
| 5,026,452 A | 6/1991 | Kodai |
| 5,172,461 A | 12/1992 | Pichl |
| 5,201,976 A | 4/1993 | Eastin |
| 5,244,836 A | 9/1993 | Lim |
| 5,250,341 A | 10/1993 | Kobayashi et al. |
| 5,266,355 A | 11/1993 | Wernberg et al. |
| 5,294,290 A | 3/1994 | Reeb |
| 5,302,431 A | 4/1994 | Schultz |
| 5,309,326 A * | 5/1994 | Minoru ........................ 361/790 |
| 5,337,063 A | 8/1994 | Takahira |
| 5,384,955 A | 1/1995 | Booth et al. |
| 5,525,400 A | 6/1996 | Manser et al. |
| 5,528,222 A | 6/1996 | Moskowitz |

(Continued)

FOREIGN PATENT DOCUMENTS

DE    19511300    10/1996

(Continued)

*Primary Examiner*—Daniel Stcyr
*Assistant Examiner*—Daniel A. Hess
(74) *Attorney, Agent, or Firm*—Fitch, Even, Tabin & Flannery

(57) ABSTRACT

A smart label comprises a circuitry pattern on a smart label substrate and a structural part comprises an integrated circuit on a chip on a structural part substrate. The structural part is attached to the smart label substrate and/or the circuitry pattern. The circuitry pattern is electrically connected to the integrated circuit on the chip via at least one capacitor located outside the chip.

20 Claims, 2 Drawing Sheets

U.S. PATENT DOCUMENTS

| | | | |
|---|---|---|---|
| 5,598,032 A | 1/1997 | Fidalgo | |
| 5,667,541 A | 9/1997 | Klun et al. | |
| 5,689,263 A | 11/1997 | Dames | |
| 5,690,773 A | 11/1997 | Fidalgo et al. | |
| 5,714,305 A | 2/1998 | Teng et al. | |
| 5,759,683 A | 6/1998 | Boswell | |
| 5,781,110 A | 7/1998 | Habeger, Jr. et al. | |
| 5,810,959 A | 9/1998 | Tanaka et al. | |
| 5,822,194 A | 10/1998 | Horiba et al. | |
| 5,837,367 A | 11/1998 | Ortiz, Jr. et al. | |
| 5,850,690 A | 12/1998 | Launay et al. | |
| 5,867,102 A | 2/1999 | Souder et al. | |
| 5,918,113 A | 6/1999 | Higashi et al. | |
| 5,918,363 A | 7/1999 | George et al. | |
| 5,920,290 A | 7/1999 | McDonough et al. | |
| 5,932,301 A | 8/1999 | Kamiyama et al. | |
| 5,935,497 A | 8/1999 | Rose | |
| 5,936,847 A | 8/1999 | Kazle | |
| 5,937,512 A | 8/1999 | Lake et al. | |
| 5,952,713 A | 9/1999 | Takahira et al. | |
| 5,962,840 A | 10/1999 | Haghiri-Tehrani et al. | |
| 5,963,134 A | 10/1999 | Bowers et al. | |
| 5,969,951 A | 10/1999 | Fischer et al. | |
| 5,973,600 A | 10/1999 | Mosher, Jr. | |
| 5,976,690 A | 11/1999 | Williams et al. | |
| 5,982,284 A | 11/1999 | Baldwin et al. | |
| 5,994,263 A | 11/1999 | Ohshima et al. | |
| 6,025,780 A | 2/2000 | Bowers et al. | |
| 6,040,630 A | 3/2000 | Panchou et al. | |
| 6,066,377 A | 5/2000 | Tonyali et al. | |
| 6,066,378 A | 5/2000 | Morii et al. | |
| 6,070,803 A | 6/2000 | Stobbe | |
| 6,077,382 A | 6/2000 | Watanabe | |
| 6,107,920 A | 8/2000 | Eberhardt et al. | |
| 6,113,728 A | 9/2000 | Tsukagoshi et al. | |
| 6,147,662 A | 11/2000 | Grabau et al. | |
| 6,161,761 A | 12/2000 | Ghaem et al. | |
| 6,177,859 B1 | 1/2001 | Tuttle et al. | |
| 6,206,292 B1 | 3/2001 | Robertz et al. | |
| 6,220,516 B1 | 4/2001 | Tuttle et al. | |
| 6,232,870 B1 | 5/2001 | Garber et al. | |
| 6,248,199 B1 | 6/2001 | Smulson | |
| 6,249,199 B1 | 6/2001 | Liu | |
| 6,259,408 B1 | 7/2001 | Brady et al. | |
| 6,288,905 B1 | 9/2001 | Chung | |
| 6,293,470 B1* | 9/2001 | Asplund | 235/487 |
| 6,315,856 B1 | 11/2001 | Asagiri et al. | |
| 6,325,294 B1 | 12/2001 | Tuttle et al. | |
| 6,330,162 B1 | 12/2001 | Sakamoto et al. | |
| 6,353,420 B1 | 3/2002 | Chung | |
| 6,371,378 B1 | 4/2002 | Brunet et al. | |
| 6,376,769 B1 | 4/2002 | Chung | |
| 6,404,643 B1 | 6/2002 | Chung | |
| 6,412,470 B1 | 7/2002 | Denz | |
| 6,412,702 B1 | 7/2002 | Ishikawa et al. | |
| 6,421,013 B1 | 7/2002 | Chung | |
| 6,432,235 B1 | 8/2002 | Bleckmann et al. | |
| 6,478,229 B1 | 11/2002 | Epstein | |
| 6,480,110 B1 | 11/2002 | Lee et al. | |
| 6,522,549 B1 | 2/2003 | Kano et al. | |
| 6,540,865 B1 | 4/2003 | Miekka et al. | |
| 6,555,213 B1* | 4/2003 | Koneripalli et al. | 428/304.4 |
| 6,557,766 B1 | 5/2003 | Leighton | |
| 6,569,280 B1 | 5/2003 | Mehta et al. | |
| 6,595,426 B1 | 7/2003 | Brunet et al. | |
| 6,600,418 B1 | 7/2003 | Francis et al. | |
| 6,644,551 B1* | 11/2003 | Clayman et al. | 235/488 |
| 6,736,918 B1 | 5/2004 | Ichikawa et al. | |
| 6,780,668 B1 | 8/2004 | Tsukahara et al. | |
| 6,843,422 B1 | 1/2005 | Jones et al. | |
| 6,853,286 B1 | 2/2005 | Nikawa et al. | |
| 2003/0209362 A1* | 11/2003 | Kasuga et al. | 174/260 |

FOREIGN PATENT DOCUMENTS

| | | |
|---|---|---|
| DE | 195 30 823 | 2/1997 |
| DE | 19634473 | 1/1998 |
| DE | 19733800 | 2/1999 |
| DE | 197 37 565 | 3/1999 |
| DE | 19758057 | 5/1999 |
| DE | 19915765 | 10/2000 |
| EP | 0227293 | 7/1987 |
| EP | 0249266 | 12/1987 |
| EP | 0545910 | 6/1993 |
| EP | 0575631 | 12/1993 |
| EP | 0620091 | 10/1994 |
| EP | 0625832 | 11/1994 |
| EP | 0692770 | 1/1996 |
| EP | 0 704 816 | 4/1996 |
| EP | 0706152 | 4/1996 |
| EP | 0717371 | 6/1996 |
| EP | 0730254 | 9/1996 |
| EP | 0 737 935 A * | 10/1996 |
| EP | 0788159 | 8/1997 |
| EP | 0824270 | 2/1998 |
| EP | 0 870 627 | 10/1998 |
| EP | 0922555 | 6/1999 |
| EP | 0991014 | 4/2000 |
| EP | 1014302 | 6/2000 |
| EP | 1 225 538 | 5/2001 |
| EP | 1 132 859 | 9/2001 |
| EP | 1130542 | 9/2001 |
| EP | 1172761 | 1/2002 |
| FI | 20001345 | 12/2001 |
| FI | 20002707 | 6/2002 |
| FR | 2744270 | 8/1997 |
| FR | 2780534 | 12/1999 |
| FR | 2782821 | 3/2000 |
| GB | 2279612 | 1/1995 |
| GB | 2294899 | 5/1996 |
| JP | 61268416 | 11/1986 |
| JP | 02141094 | 5/1990 |
| JP | 05155191 | 6/1993 |
| JP | 5279841 | 10/1993 |
| JP | 09197965 | 7/1997 |
| JP | 11221986 | 8/1999 |
| JP | 2000048153 | 2/2000 |
| JP | 2000057287 | 2/2000 |
| JP | 2000113147 | 4/2000 |
| JP | 2000215288 | 8/2000 |
| JP | 2000235635 | 8/2000 |
| JP | 2000242740 | 9/2000 |
| JP | 2001118040 | 4/2001 |
| JP | 2002140672 | 5/2002 |
| WO | WO 93/01571 | 1/1993 |
| WO | WO 97/14112 | 4/1997 |
| WO | WO 98/44195 | 10/1998 |
| WO | WO 98/49652 | 11/1998 |
| WO | WO 99/08245 | 2/1999 |
| WO | WO 99/24934 | 5/1999 |
| WO | WO 99/40760 | 8/1999 |
| WO | WO 99/48071 | 9/1999 |
| WO | WO 00/45353 | 8/2000 |
| WO | WO 01/16878 | 3/2001 |
| WO | WO 01/85451 | 11/2001 |
| WO | WO 02/49093 | 6/2002 |
| WO | WO 02/082365 | 10/2002 |

* cited by examiner

SMART LABEL AND A SMART LABEL WEB

This is a continuation of prior application Ser. No. PCT/FI02/00444, filed on May 23, 2002, designating the United States, which claims the benefit of Finland Ser. No. 20011140, filed on May 31, 2001.

BACKGROUND OF THE INVENTION

The present invention relates to a smart label and a smart label web. The smart label comprises a circuitry pattern on a smart label substrate and a structural part comprising an integrated circuit on a chip on a structural part substrate. The structural part is attached to the smart label substrate and/or the circuitry pattern, and the circuitry pattern is electrically connected to the integrated circuit on the chip. A smart label web comprises smart labels one after another and/or side by side.

Smart labels are often constructed so that sequential and/or parallel circuitry patterns are formed on a flexible web-like substrate and an integrated circuit on a chip is attached to each smart label by a suitable flip-chip technology. Another technique is to attach a separate structural part comprising an integrated circuit on a chip to a smart label. An integrated circuit on a chip is attached by a suitable flip-chip technology to a structural part before attaching the structural part to a smart label. The term flip-chip technology includes many variants, and a suitable technology shall be selected e.g. according to process conditions.

When a chip is attached to a smart label or a structural part by a flip-chip technology, most technologies require a substrate material which must resist high process temperatures. Therefore the selection of materials is limited. Furthermore, when a chip is attached directly on a smart label, the alignment of the chip must be made very accurately. The chip is also very sensitive to mechanical impacts and is easily broken when the bare chip without any cover is processed.

The silicon chips used in smart labels can be quite expensive because they contain a capacitor. At the same time, the capacitor integrated in the chip suffers from inadequate frequency tolerances and poor quality. The design of the circuitry pattern is due the constant inductance restricted. The quality factor of the capacitor in the chip is approximately 80 which does not completely meet the requirements of the whole construction of the smart label. Therefore, the circuitry pattern must be quite thick, which makes the manufacture of the circuitry patterns cumbersome and expensive. Furthermore, the techniques used for forming circuitry patterns are limited. The quality factor refers to the ratio between the stored energy and the energy which is dissipated per cycle. The greater the quality factor is, the smaller is the dissipated energy.

A separate structural part comprising a chip has several advantages but also several deficiencies. The process of attaching the structural part to a smart label substrate is slow and the techniques for attaching are less sophisticated. For example, the structural part must often be placed diagonally with respect the longitudinal direction of the smart label. The structural part may be fastened to the smart label only at its ends by crimping. The crimping makes an electrical connection possible through the substrate of the smart label but then changing stray capacitance may cause harm to the functionality of the smart label because the distance of the structural part from the circuitry pattern varies.

It is possible to attach the structural part substantially entirely on the smart label but it must be attached to the front side of the smart label to provide an electrical contact between the circuitry pattern and the chip. An isolation is required between the structural part and the circuitry pattern which necessitates a separate process step.

SUMMARY

The smart label and the smart label web of the invention overcome the problems of the prior art. The smart label according to the invention is characterized in that the integrated circuit on the chip is connected to the circuitry pattern via at least one capacitor located outside the chip. The smart label web according to the invention is characterized in that the integrated circuit on the chip is connected to the circuitry pattern via at least one capacitor located outside the chip.

The smart label according to the invention provides e.g. the following advantages:

- The structural part can be attached to the smart label at high speed, because the structural part has an adhesive ready on its surface,
- the structural part can be attached to the smart label by using a dispenser operating in the machine direction,
- thanks to the structure of the smart label, it is possible to use a capacitor with a good quality factor. The thickness of the circuitry pattern can be reduced and still maintain a high quality factor for the whole system, and thus the manufacture of the circuitry patterns is cheaper and easier,
- the structure of the smart label makes it possible to use cheaper silicon chips because the chips can be delivered without a capacitor integrated in the chip. At the same time, the frequency tolerances become smaller and the quality better enhancing a good yield level of the integrated circuits,
- a good mechanical protection is provided for the chip, because the chip is shielded on both sides by a substrate. In addition, when a polyolefin film or a corresponding material is used as a substrate, it is of a soft and resilient material and can absorb and dampen mechanical impacts on the chip,
- the structure of the invention does not necessarily need a lead-through, such as crimping, and thus the costs are lowered,
- the structure makes it possible to use quick techniques for forming circuitry patterns, such as flexographic printing, because thinner metal layers can be etched with thinner etch resists,
- since the capacitor is outside the chip, it provides freedom for designing the circuitry pattern because the inductance can be selected freely,
- the structural part is attached substantially entirely to the smart label and thus the stray capacitance caused by the structural part remains substantially constant, and
- the stray capacitance between the structural part and the circuitry pattern can be utilized as a shunt connection of a capacitance.

Further, if the structural part is attached to the reverse side of the smart label substrate, some of additional advantages are achieved:

- the attachment of the structural part to the smart label can be made with greater tolerances than the direct attachment of the chip or the attachment of the structural part on the front side to the circuitry pattern of the smart label, the circuitry pattern of the smart label does not need stripping of the etch resist from the structural part connection area, and there is no need to isolate the structural part and the circuitry pattern of the smart label from each other to avoid the risk of short circuiting and thus there is one process step less.

In the present application, smart labels refer to labels comprising an RF-ID circuit (identification) or an RF-EAS circuit (electronic article sur- veillance). A smart label web consists of a sequence of successive and/or adjacent smart labels. A smart label comprises a circuitry pattern on a smart label substrate and a separate structural part comprising an integrated circuit on a chip on a structural part substrate attached to the smart label substrate. The circuitry pattern of the smart label can be manufactured by methods known as such, for example by printing the circuitry pattern with an electroconductive printing ink on a film, by etching the circuitry pattern on a metal film, by punching the circuitry pattern from a metal film, by winding the circuit pattern of for example copper wire, or by plating the conductor, but preferably the circuitry pattern is etched or plated. Capacitor plates are formed at the same time on the smart label substrate.

The electrically operating RFID (radio frequency identification) circuit of the smart label is a simple electric oscillating circuit (RCL circuit) operating at a determined frequency. The circuit consists of a coil, a capacitor and an integrated circuit on a chip. The integrated circuit comprises an escort memory and an RF part which is arranged to communicate with a reader device. The capacitor of the RCL circuit is formed outside the chip, in other words, the capacitor plates are formed on the smart label substrate and the structural part substrate.

The material of the smart label substrate is flexible but still has a suitable rigidity and fulfils certain properties, such as a minor dissipation factor. The dissipation factor describes the dielectric losses of a capacitor. Suitable materials include for example polyolefins, such as polypropylene or polyethylene. The dissipation factors of the polyolefins are approximately equal to zero.

To form the structural parts, a carrier web is first manufactured, comprising a base web and thermoplastic material on the surface of the base web. The material of the base web is preferably polyimide or polyethylene terephthalate. The surface of the base web is provided with a conductive metal coating for electrical contacts of structural parts. A thermoplastic material is attached to that side of the base web which has the conductive metal coatings for electrical contacts of the structural parts. Thermoplastic materials refer to materials which can be formed by applying heat. As a raw material, the thermoplastic film can be in fluid form or as a film; preferably, it is a film.

Thermoplastic films are films whose surface can be made adherent to another surface by the effect of heat, but which are substantially non-adherent at room temperature. Thermoplastic films can also be heated several times without substantially affecting the adherence.

The thermoplastic film can be a thermoplastic anisotropic conductive film (AFC). When a thermoplastic film is used, there is no need for an underfill, because the thermoplastic film forms a sufficiently flexible backing for the chip. As an example to be mentioned, thermoplastic films include anisotropic conductive films 8773 and 8783 (Z-Axis Adhesive Films 8773 and 8783) by 3M. The films contain conductive particles in such a way that they are electroconductive in the thickness direction of the film only, that is, there is no conductivity in the direction of the plane of the film. The thermoplastic film can be made fluid by means of heat and pressure. When cooled, the thermoplastic film is crystallized and gives the bond mechanical strength. Curing by heat will not be necessary. The thermoplastic film can be of e.g. polyester or polyether amide. The conductive particles, having a size of typically 7 to 50 µm, can be e.g. glass particles coated with silver. The thickness of the thermoplastic film is typically 20 to 70 µm. The thermoplastic film is normally formed on the surface of a release paper or the like. The release paper can be released from the film in connection with or after the heating of the film.

Integrated circuits on chips are attached one after another and/or next to each other on the surface of the thermoplastic material, which is preferably a thermoplastic film, by using flip-chip technology. Because the dimensions of the structural part to be formed of the carrier web are small, it is possible to place the chips relatively close to each other on the carrier web, and thereby long paths will not be needed for attaching the chip. With short paths, it is possible to implement sufficiently accurate positioning more easily than on attachment of the chip directly to the circuitry pattern, and the position of the chip may vary within a larger range. The dissipation factor of the thermoplastic material must not be high. Thus the capacitor consisting of a capacitor plate on a smart label substrate and a capacitor plate on a structural part substrate has a high quality factor.

The thermoplastic film is normally laminated on the base web by means of heat and/or pressure. The bumped chips are picked up from a silicon wafer by means of a die sorter and placed in a continuous manner onto the surface of the thermoplastic film. When the chip is placed in its position, the web containing the base web and the thermoplastic film is heated on the opposite side so that the chip is lightly tacked to the web before making the final bond. It is also possible that the thermoplastic film is in a sufficiently tacky form after the lamination, wherein the bond of the chip can be made without simultaneous heating. After this, the final bond of the chip is made by applying heat and/or pressure. At the same time, a release paper web can be laminated onto the surface of the thermoplastic film, but this is not always necessary. The final bond of the chip can be made by means of heat and/or pressure for example by a thermal resistor or a series of thermal resistors or in a nip formed by two rolls, where at least one of the contact surfaces forming the nip is heated and at least one is resilient.

In addition to the above-mentioned nip, a nip can also be formed between a shoe roll and its counter roll. The thermoplastic film can also be heated by microwaves, wherein the film can be heated selectively, simultaneously applying pressure on the bond (materials blended with selective additives are heated in a microwave field).

In the next step, structural parts comprising of an integrated circuit on a chip are separated from a carrier web, and the structural parts are attached to each of sequential semi-products of smart labels one after another, and a ready smart label web is formed. The structural part comprises a first capacitor plate and a second capacitor plate. The smart label substrate also comprises a first capacitor plate and a second capacitor plate.

The structural part is attached either to that side of the smart label, on which the circuitry pattern is provided, or to the reverse side, in such a way that the thermoplastic film and the chip are in contact with the smart label substrate and the side of the base web is left as the outer surface of the structural part. Preferably, the structural part is on the reverse side.

The structural part is attached to a semi-product of a smart label so that the first capacitor plates are substantially aligned and the second capacitor plates are substantially aligned. The first capacitor plates form a first capacitor and the second capacitor plates form a second capacitor. The capacitors are connected in series. Another possibility is to replace one capacitor by a crimping or a plated through hole forming an electrical connection. In that case there is only one capacitor.

The structural part is attached to the smart label substantially entirely, wherein a reliable bond is achieved. When making the bond, that part of the smart label in the smart label web is heated, to which the structural part is attached, or the structural part is heated, wherein the surfaces are made to adhere to each other. The final bond of the structural part is made by applying heat and/or pressure under similar process conditions as making the bond of the chip. Simultaneously with the attachment of the structural part, it is possible either to laminate, on both sides of the smart label web, the other web layers simultaneously onto the structure, or to leave out the layers and to use the nip to achieve an attachment only. It is also possible to start cross-linking of an adhesive layer upon combining several web layers simultaneously, to provide a more reliable lamination result or a more rigid structure.

When the structural part is attached to that side of the smart label, on which the circuitry pattern is provided, and an anisotropic conductive thermoplastic material is used as the thermoplastic material of the structural part, the anisotropic conductive material of the structural part and the circuitry pattern of the smart label must be isolated from each other to avoid the risk of short circuiting. The isolation can be made for example by screen printing or flexographic printing. If the structural part is attached to the reverse side of the smart label, on which the circuitry pattern is provided, no isolation is needed.

The manufacture of the carrier web and the manufacture of the smart label web can take place in the same process or they can be separate processes.

In the following, the invention will be described with reference to the appended drawings (the dimensioning in the drawings does not correspond to the reality), in which

DETAILED DESCRIPTION

Figure 1:
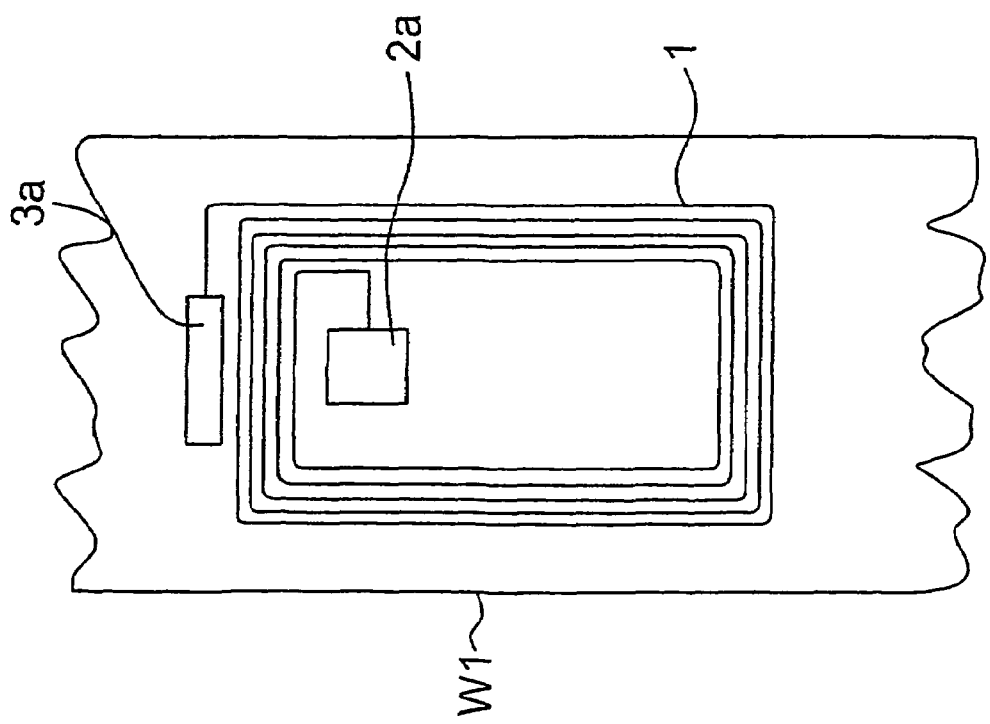
FIG. 1 shows a smart label web according to the invention in a top view.

FIG. 1 shows a smart label substrate web W1 according to the invention. A circuitry pattern 1, a first capacitor plate 2a and a second capacitor plate 3a are on a smart label substrate web. The circuitry pattern 1, the first capacitor plate 2a and the second capacitor plate 3a may be formed by a flexographic printing and an electrolysis on a film which has been attached to the smart label substrate web W1 by a suitable adhesive. The circuitry pattern 1, the first capacitor plate 2a and the second capacitor plate 3a may be made of aluminium or copper. For example an aluminium layer whose thickness can be 9 µm is suitable for forming a circuitry pattern and capacitor plates, because the thickness of the conductive material can be reduced due to the new lay-out of the smart label.

Figure 2:
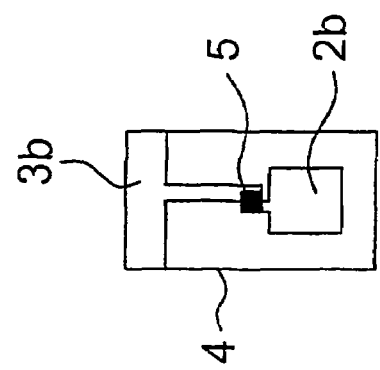
FIG. 2 shows a structural part in a top view.

FIG. 2 shows a structural part 4 according to the invention. An integrated circuit on a chip 5, a first capacitor plate 2b and a second capacitor plate 3b are on a structural part substrate. The first capacitor plate 2b and the second capacitor plate 3b may be made of aluminium, copper or silver paste. For example an aluminium layer whose thickness can be 9 µm is suitable for forming capacitor plates.

A structural part 4 is attached to each of sequential semi-products of smart labels one after another, and a ready smart label web is formed. The structural part 4 is attached to a semi-product of a smart label so that the first capacitor plates 2a and 2b are substantially aligned and the second capacitor plates 3a and 3b are substantially aligned. The first capacitor plates form a first capacitor and the second capacitor plates form a second capacitor. The capacitors are connected in series.

The structural part 4 comprises a structural part substrate, on which the first capacitor plate 2b and the second capacitor plate 3b are formed. The integrated circuit on a chip is attached to an anisotropic conductive thermolastic film on the structural part substrate on that side of the structural part substrate where the capacitor plates are located, in other words, the anisotropic conductive thermoplastic film covers the capacitor plates and serves as an attachment base for the chip.

Referring to FIGS. 1 and 2, an example of a dimensioning of a smart label can be given. When a capacitor whose capacitance is approximately 23 pF is formed of two capacitors connected in series and the thickness of the dielectric material between the capacitor plates is 28 µm and the dielectric constant is approximately 2, the size of the first capacitor plate 2a on the smart label substrate can be 11 mm×11 mm, the size of the first capacitor plate 2b on the structural part substrate can be 10 mm×11 mm, the size of the second capacitor plate 3a on the smart label substrate can be 22 mm×5.5 mm and the size of the second capacitor plate on the structural part substrate can be 20 mm×5.5 mm. The capacitor plates 2a, 3a on the smart label substrate are preferably slightly larger compared to the capacitor plates 2b, 3b on the structural part substrate because the alignment of the capacitor plates is then easier.

Figure 3:
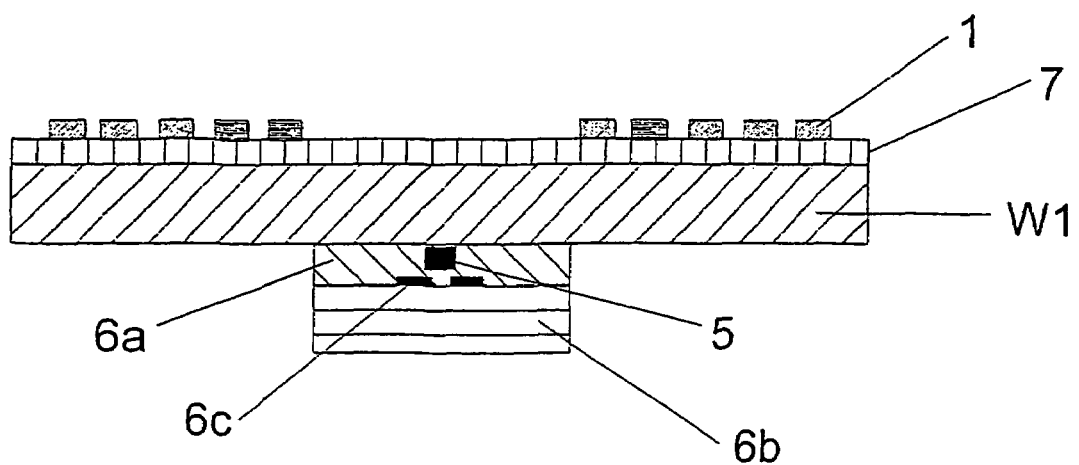
FIG. 3 illustrates a structure of a smart label in a cross-section.

FIG. 3 shows the cross-section of the smart label. The structural part comprises an integrated circuit on a chip 5, a thermoplastic film 6a, and a layer 6b consisting of the base web. On the surface to which the thermoplastic film 6a is attached, the layer 6b is provided with the conductive metal coating 6c of the structural part. The film 7 on which the circuitry pattern 1 is formed has been attached to the smart label substrate web W1 by a suitable adhesive with a low dissipation factor.

The above-described facts do not restrict the invention, but the invention may vary within the scope of the claims. The structural part may be attached to either side of the smart label substrate. The main idea of the present invention is that integrated circuits on chips can be electrically connected to circuitry patterns via capacitors which are formed on the smart label substrate and the structural part substrate.

What is claimed is:

1. A smart label comprising a circuitry pattern and at least one capacitor plate on a smart label substrate, and a structural part comprising an integrated circuit on a chip and at least one capacitor plate on a structural part substrate, the structural part substrate being substantially smaller than the smart label substrate and being attached to the smart label substrate in such a manner that the capacitor plate on the smart label substrate and the capacitor plate on the structural part substrate are aligned thereby electrically connecting the circuitry pattern and the integrated circuit on the chip through a dielectric layer between the capacitor plates wherein the structural part is attached to the smart label substrate on the side opposite to the side where the circuitry pattern is located and the dielectric layer comprises the smart label substrate.

2. The smart label according to claim 1, wherein the integrated circuit on the chip is connected to the circuitry pattern via two capacitors connected in series and located outside the chip.

3. The smart label according to claim 2, wherein the smart label substrate has a dissipation factor of not more than $0.7 \times 10^{-3}$.

4. The smart label according to claims 1 or 3, wherein the material of the smart label substrate is polyolefin.

5. The smart label according to claim 4, wherein the polyolefin is selected from the group consisting of polypropylene and polyethylene.

6. The smart label according to claim 1, wherein the structural part comprising the integrated circuit on the chip is attached to the smart label by means of a thermoplastic material.

7. The smart label according to claim 6, wherein the thermoplastic material is an anisotropic conductive thermoplastic film.

8. The smart label according to claim 1 or 6, wherein the integrated circuit on the chip is located between the thermoplastic material and the smart label substrate.

9. The smart label according to claim 1, wherein the material of the structural part substrate is selected from the group consisting of polyimide and polyester.

10. A smart label web comprising smart labels one after another andlor side by side, the smart label comprising a circuitry pattern and at least one capacitor plate on a smart label substrate and a structural part comprising an integrated circuit on a chip, and at least one capacitor plate on a structural part substrate, the structural part substrate being substantially smaller than the smart label substrate and being attached to the smart label substrate in such a manner that the capacitor plate on the smart label substrate and the capacitor plate on the structural part substrate are aligned thereby electrically connecting the circuitry pattern and the integrated circuit on the chip through a dielectric layer between the capacitor plates wherein the structural part is attached to the smart label substrate on the same side where the circuitry pattern is located and the dielectric layer comprises a printed isolation layer.

11. The smart label web according to claim 10, wherein the integrated circuit on the chip is connected to the circuitry pattern via two capacitors connected in series and located outside the chip.

12. A smart label comprising a circuitry pattern on a smart label substrate; and a structural part, the structural part comprising a thermoplastic film, a base web, and an integrated circuit on a chip on the thermoplastic film, the structural part being attached to the smart label substrate, and the circuitry pattern being electrically connected to the integrated circuit on the chip by at least one capacitor outside the chip, at least one capacitor plate of the at least one capacitor on the smart label substrate opposing at least one capacitor plate of the at least one capacitor on the surface of the base web of the structural part, at least one of the opposing plates being larger than its opposite plate, the structural part smaller than the smart label substrate wherein the integrated circuit on the chip is connected to the circuitry pattern via two capacitors connected in series and located outside the chip and wherein the structural part is attached to the smart label substrate on the side opposite to the side where the circuitry pattern is located, and the dielectric layer comprises the smart label substrate.

13. The smart label according to claim 12, wherein the thermoplastic film material is an anisotropically conductive.

14. The smart label according to claim 13, wherein the capacitor comprises capacitor plates which are formed on the smart label substrate and the structural part substrate, the anisotropically conductive thermoplastic film on the same side of the smart label substrate where the circuitry pattern is located and is isolated from the circuitry pattern.

15. The smart label according to claim 13, wherein the capacitor comprises capacitor plates which are formed on the smart label substrate and the structural part substrate, the smart label substrate forming a dielectric layer between the capacitor plates.

16. The smart label according to claim 12, wherein the smart label substrate has a dissipation factor of not more than $0.7 \times 10^{-3}$.

17. The smart label according to claims 12 or 16, wherein the material of the smart label substrate is polyolefin.

18. The smart label according to claims claim 12 wherein the structural part comprising the integrated circuit on the chip is attached to the smart label by the thermoplastic film.

19. The smart label according to claim 12, wherein the base web of the structural part comprises material selected from the group consisting of polyimide and polyester.

20. The smart label according to claim 18, wherein the integrated circuit on the chip is located between the thermoplastic material and the smart label substrate.

* * * * *